Jan. 21, 1969
D. WETHERELL
3,422,610
CORN TOPPER
Filed Aug. 11, 1965
Sheet 1 of 4
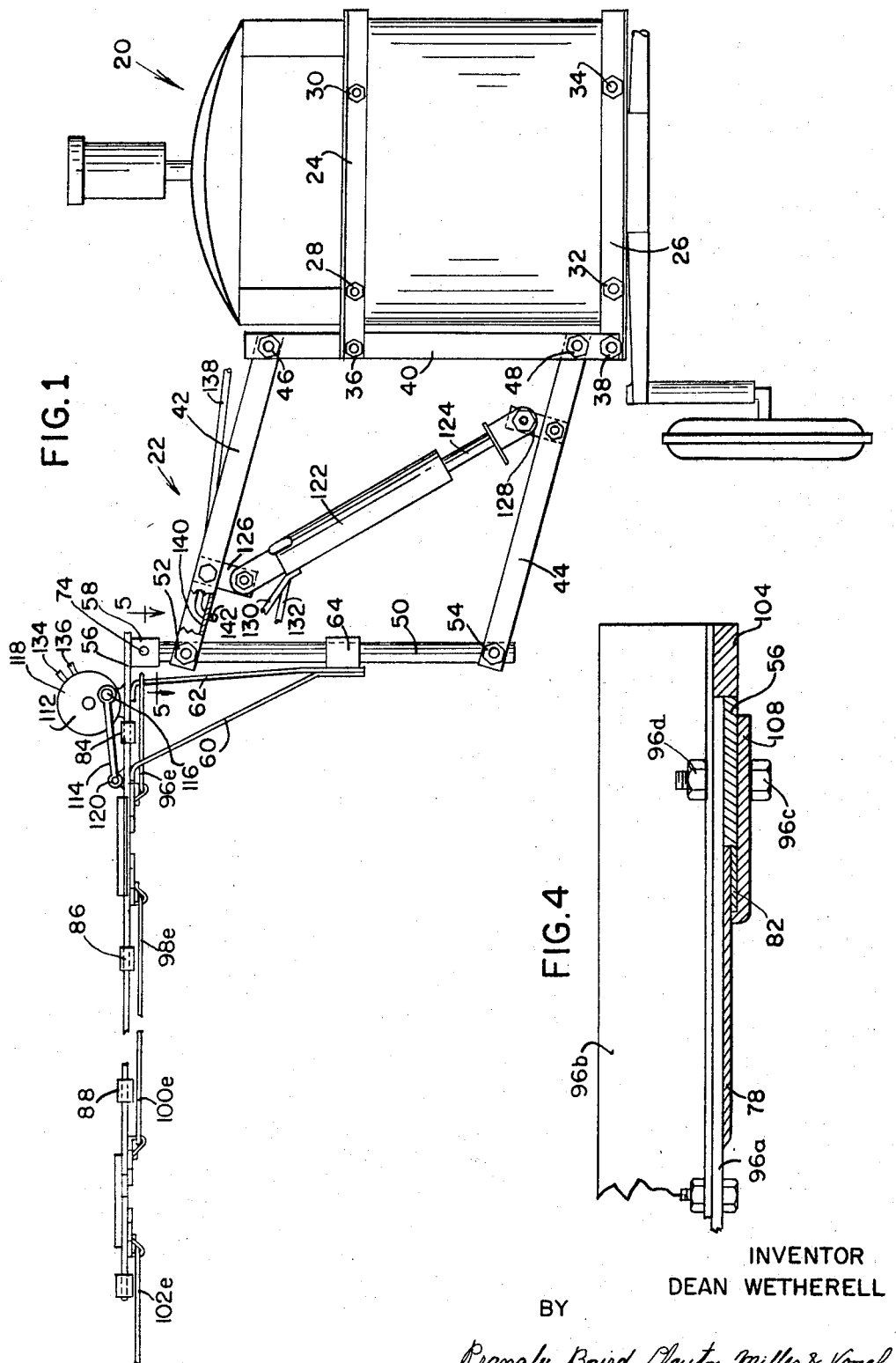
INVENTOR
DEAN WETHERELL
BY
Branaly, Baird, Clayton, Miller, & Vogel
ATTYS.

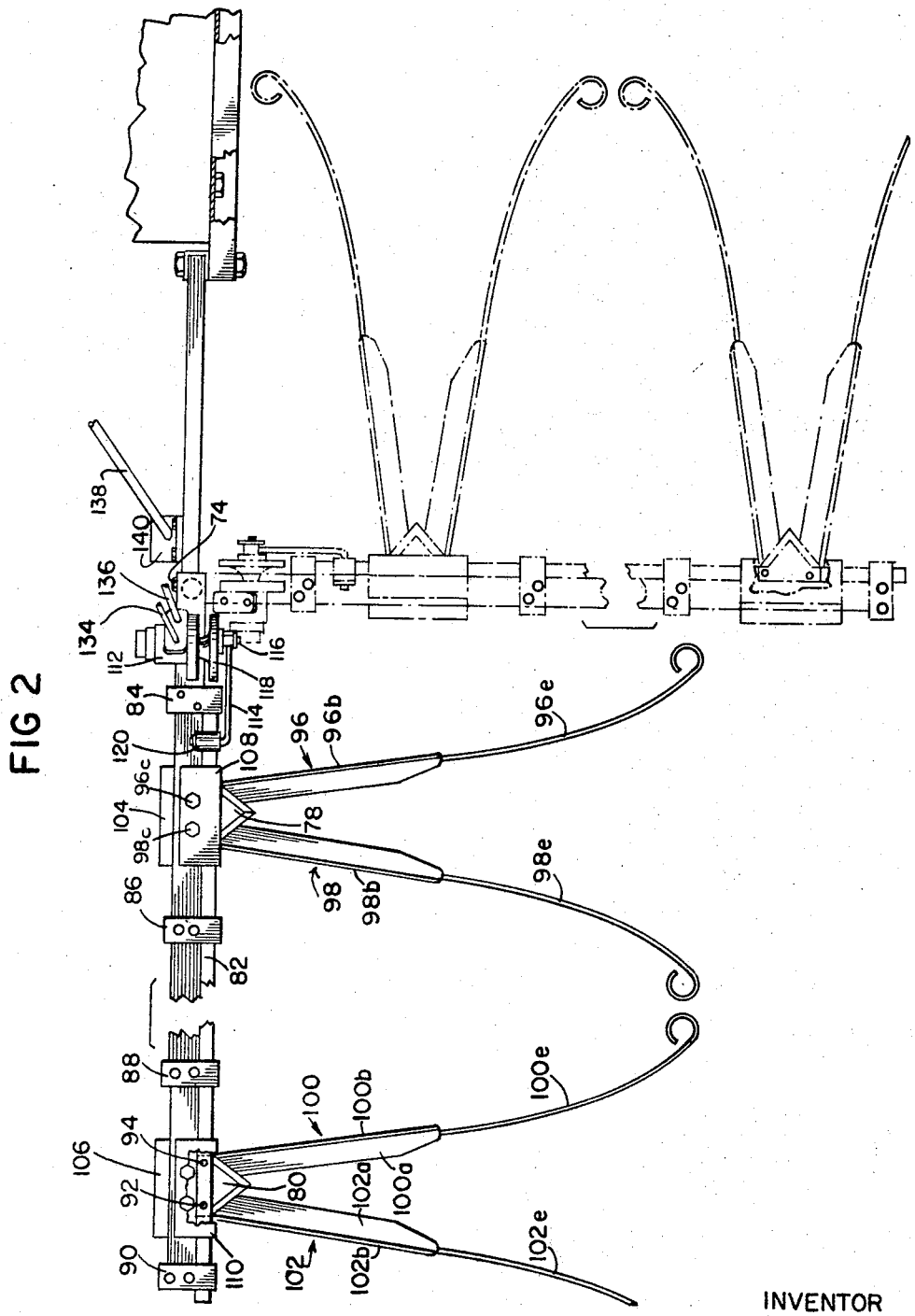

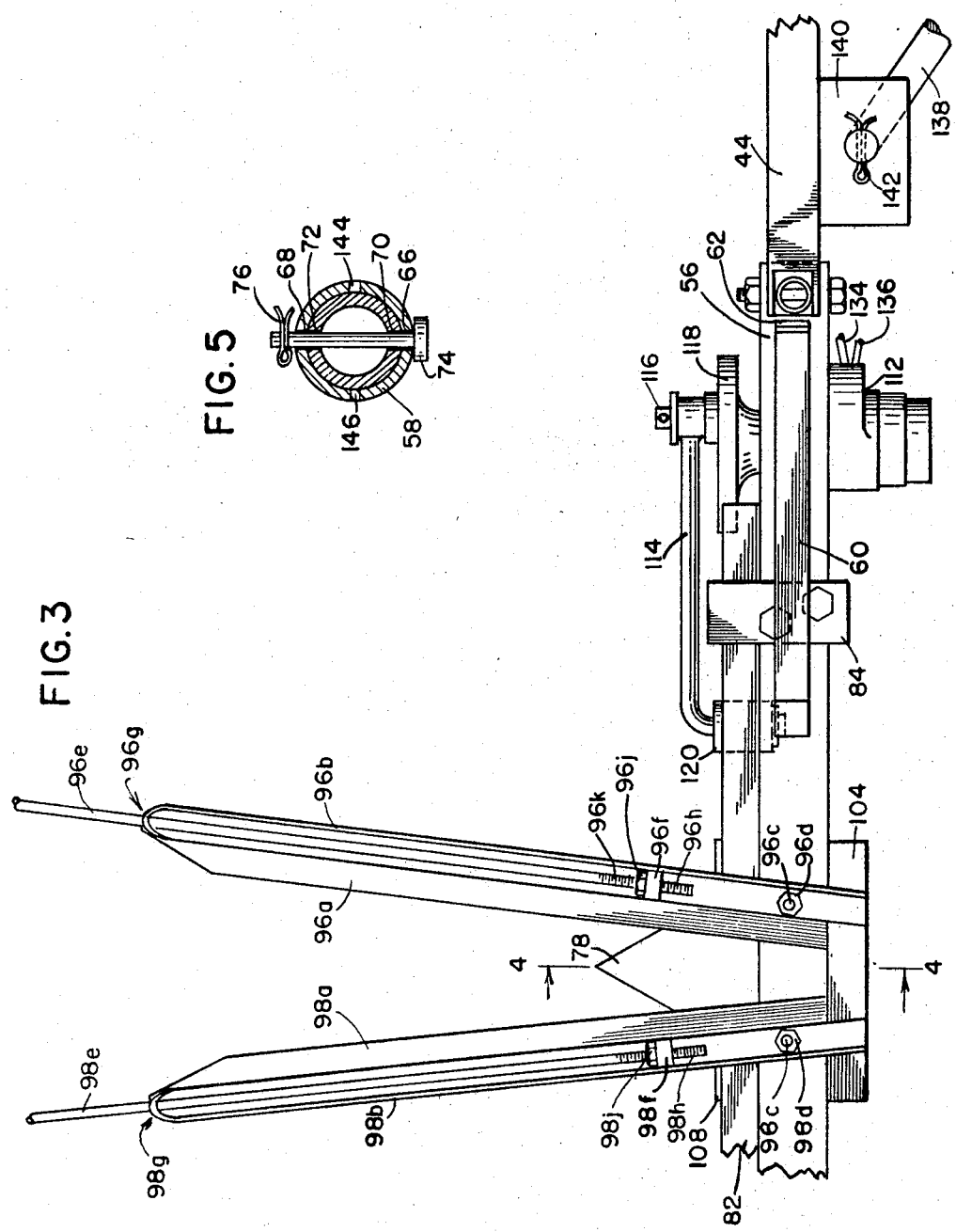

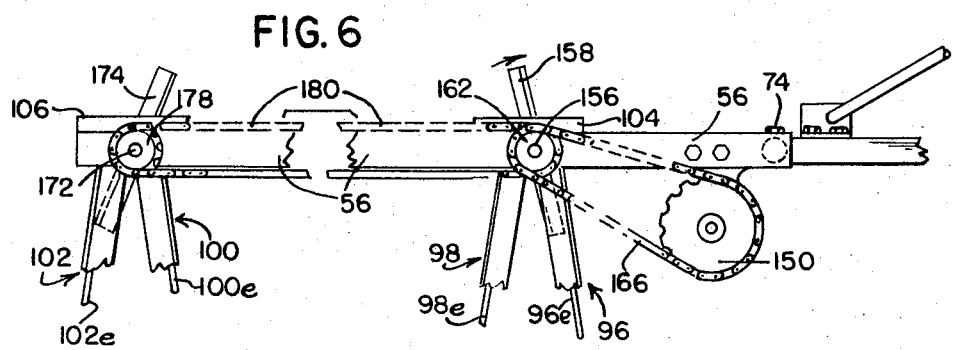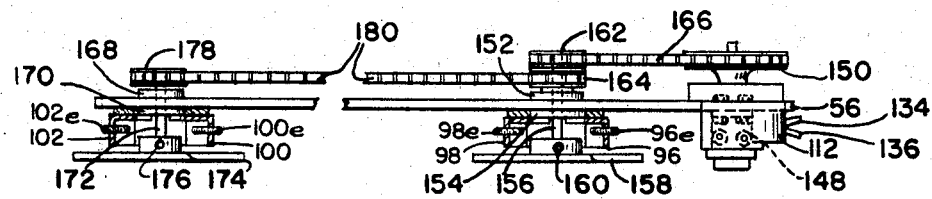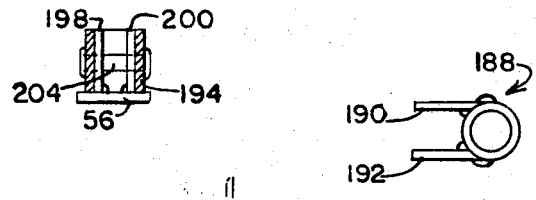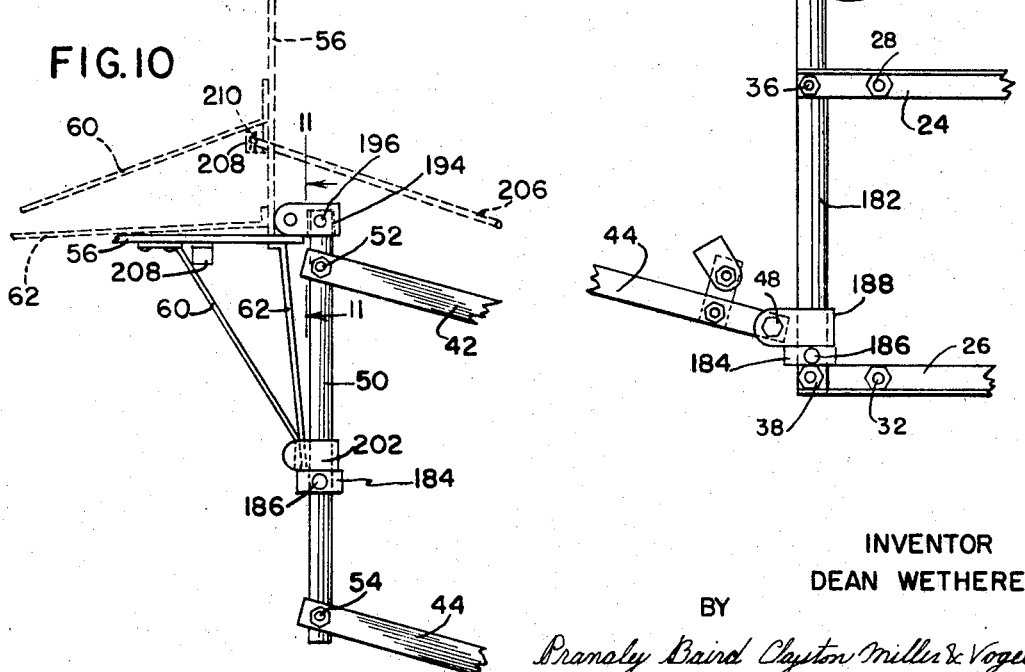

United States Patent Office 3,422,610
Patented Jan. 21, 1969

3,422,610
CORN TOPPER
Dean Wetherell, Osage, Iowa 50461
Filed Aug. 11, 1965, Ser. No. 478,899
U.S. Cl. 56—63                                19 Claims
Int. Cl. A01d 35/16, 47/00, 55/28

ABSTRACT OF THE DISCLOSURE

This invention relates to an attachment for a tractor which severs the tops from two rows of standing corn simultaneously. A horizontally extending arm carrying the cutters is supported by four members pivotally connected to each other in the form of a parallelogram, one of said members being fixed to the tractor and the arm being supported on the member parallel thereto. A hydraulic cylinder and piston combination is connected to move the parallelogram members relative to one another to raise and lower the arm while maintaining it in the horizontal position.

---

This invention relates to farm machinery. More particularly, it relates to an attachment for severing the tops of standing cornstalks.

There are a variety of circumstances under which it is desirable to have a machine, device, or attachment for severing the tops of standing cornstalks or the like. In certain instances the purpose is to harvest the tops and in others the purpose is to discard the tops before some or all of the remainder of the corn is harvested. For example, in connection with the harvesting of corn for silage, it is often desirable to sever and discard the tops of the cornstalks, by way of illustration, the portion above the ears, for the purpose of increasing the proportion of grain in the silage.

In this latter operation it is desirable to have a top severing device or attachment which extends out laterally from the vehicle on which it is carried or of which it is a part so that the vehicle can be moved alongside of and parallel to the row or rows of corn being topped to sever the tops and permit them to drop on the ground but leave the remainders of the stalks still standing. A field chopper or other like harvesting machine may then follow along after the topper immediately, if desired, to harvest the topped cornstalks.

It is an object of this inventtion to provide a machine or device for severing the tops of cornstalks standing in the field while leaving the remainders of the stalks standing so that part or all of them may be harvested in the usual way.

A further object of the invention is to provide an attachment which may be readily mounted on a tractor, a field chopper or the like for severing the tops of cornstalks standing in the field while leaving the remainders of the stalks standing.

Still another object is to provide such an attachment which is easily remotely raised, lowered and operated from and by power supplied by the tractor, field chopper or the like to which it is attached.

A still further object is to provide such an attachment which comprises vertically extending pivot means supporting the portion thereof which carries the severing means in a substantially horizontal position for horizontal pivotal movement relative to the tractor, field chopper or the like and means releasably maintaining said portion in a position extending laterally outwardly from the tractor, field chopper or the like against horizontal pivotal movement induced by engagement of the said portion with cornstalks and releasable by engagement of the said portion with objects such as trees which offer substantially greater resistance to movement than the cornstalks do.

Still another object is to provide such an attachment in which the cutting means comprises a hydraulically operated shear type sickle.

A still further object is to provide such an attachment which comprises means for making a plurality of cuts and which may be raised and lowered to various positions in each of which each cut made by said cutting means is at substantially the same distance above the plane defined by the ground contacting portions of the machine on which the attachment is mounted as is each other cut made thereby.

Still another object is to provide such an attachment in which the severing means is carried by an arm which in its operating position extends horizontally and laterally outwardly from the machine on which the attachment is mounted and which may be secured in a position generally parallel to the side of the said machine for road travel.

A still further object is to provide a corn topping device or attachment which comprises novel means for mounting the corn guide rods to the cutter fingers.

Another object is to provide such a device or attachment in which the severing means comprises a rotary cutting blade.

Another object is to provide such a device or attachment which comprises an arm supporting the severing means and extending out laterally and horizontally from the vehicle on which it is supported and which arm is carried by a parallelogram type of mounting with which it is aligned so as to permit the arm to be raised and lowered while maintaining it in the said horizontal position.

Still another object is to provide such a device or attachment which comprises an arm supporting the severing means and extending out laterally and horizontally from the vehicle on which it is supported and which arm is carried by a parallelogram type of mounting including hydraulic means extending between two sides of the parallelogram for raising and lowering the said arm while it is maintained in the said horizontal position.

Other objects will appear hereinafter.

In order that the invention may be better understood, reference is made to the accompanying drawings which form a part of this specification and in which FIGURE 1 is a view in front elevation of an attachment embodying the features of the present invention which is shown mounted on a tractor of a well known type;

FIGURE 2 is a top plan view of the attachment shown in FIGURE 1;

FIGURE 3 is a bottom plan view of a fragmentary portion of the attachment shown in FIGURE 1;

FIGURE 4 is a view in cross section on the line 4—4 in FIGURE 3;

FIGURE 5 is a view in cross section on the line 5—5 in FIGURE 1;

FIGURE 6 is a fragmentary view similar to FIGURE 2 and showing a modification of the attachment shown in the latter figure;

FIGURE 7 is a front elevational view of the modification shown in FIGURE 6;

FIGURE 8 is a fragmentary view similar to FIGURE 1 and showing still another modification;

FIGURE 9 is a plan view of one of the brackets employed in the modification illustrated in FIGURE 8;

FIGURE 10 is another fragmentary view similar to FIGURE 1 and showing still another modification; and FIGURE 11 is a view in cross section on the line 11—11 in FIGURE 10.

Referring first to FIGURE 1, it will be seen that there is shown therein a fragmentary portion of the front end of a tractor designated generally 20 of a well known type on which the attachment 22 embodying the features of the present invention is mounted. For the purpose of securing the attachment on the tractor, two lengths of angle iron 24 and 26 are provided. On the front end of this particular tractor there are four nuts 28, 30, 32, and 34 positioned as indicated which cooperate with bolts for securing certain parts of the tractor in place. The pieces of angle iron 24 and 26 are formed with suitable openings therein to permit each of them to be mounted on a pair of those bolts and secured in place on the tractor, as shown, by the four nuts 28, 30, 32, and 34 with their left-hand ends, as shown in FIGURE 1, projecting a short distance beyond the side of the tractor.

Those projecting ends of the angle iron mounting members 24 and 26 are bolted at 36 and 38, as shown, to a vertically extending length of channel iron 40. The channel iron upright 40, in turn, serves as a support for a pair of laterally extending parallel arms 42 and 44 secured thereto by bolts and nuts at 46 and 48 which serve as pivots, as will be described.

The outer ends of the arms 42 and 44 are, in turn, secured to a length of metal tubing 50 extending vertically in parallel relation to the channel iron upright 40. A portion of the web of each of the channel iron arms 42 and 44 is cut away at their outer ends so as to leave ears which extend on opposite sides of the tubular upright 50 and are secured thereto by bolts and nuts 52 and 54, as shown, which also serve as pivots.

The means by which the tops of the cornstalks are severed are mounted on an elongated metal bar 56. A collar 58, which is welded or otherwise suitably secured to the bar 56 adjacent its inner end, fits over the upper end of the tubular upright 50 to provide support for that bar. Additional support therefor is furnished by a pair of braces 60 and 62, the upper ends of which are secured to the underface of the bar 56 as, for example, by welding and are similarly secured at their lower ends to another collar 64, also mounted on the tubular upright 50 as may be seen.

Both of the collars 58 and 64 are slidably and rotatably received on the upright 50. Accordingly, the bar 56 and the various elements supported thereon may be rotated in a horizontal plane on the upright 50 as a pivot. In addition, upon the removal of the fastening means 52, the bar 56 and the various elements carried thereby may be separated from the upright 50 by sliding the collars 58 and 64 upwardly thereon.

It is desirable that the bar 56 in its normal operating position extend laterally outwardly from the vehicle, such as tractor 20, on which it is mounted in a direction which is, at least, approximately perpendicular to the path of travel of that vehicle and be at the same time so supported that if, while being moved along by the vehicle it engages an obstacle such as a tree, it will rotate on the upright 50 as a pivot so that the bar 56 and the elements carried thereby will not be damaged by the encounter.

To this end, as best seen in FIGURES 1 and 5, diametrically oposed openings 66 and 68 are provided in the collar 58 and cooperating openings 70 and 72 are similarly provided adjacent the upper end of the upright 50. These 4 openings are so positioned that they are aligned when the bar 56 is in its normal operating position as shown in FIGURE 5. A shear pin 74 extends through these openings and is secured in place by a cotter pin 76. The shear pin 74 is so designed that the force exerted by engagement of the arm 56 with cornstalks in normal operation is not sufficient to shear it off but so that it is sheared by engagement of the arm 56 with a relatively immovable object such as a tree.

In the embodiment shown a shear type sickle is provided to cut off or sever the heads of the cornstalks. The sickle may comprise one or more cutting knives as desired but it is preferable to provide two knives 78 and 80 as in the embodiment shown so that two rows of the corn may be cut at the same time.

As best seen in FIGURES 2 and 4, the knives 78 and 80 are mounted on a slide 82 with their centers longitudinally of the bar 56 spaced apart a distance of approximately 38″ which is the normal distance between corn rows. The slide 82 is supported to slide longitudinally of the bar 56 along its front edge by a plurality of guides 84, 86, 88, and 90 which are bolted to the bar 56, as shown. The knives 78 and 80 are seated in recesses formed in the slide 82 so that their lower surfaces are flush with the lower surface of the slide 82 and are secured to the slide by suitable means such as, for example, the rivets 92 and 94 in the case of the knife 80 as shown in FIGURE 2.

Referring now more particularly to FIGURES 2, 3, and 4, it will be seen that each knife has associated therewith a pair of corn guides or fingers 96 and 98 for the knife 78 and 100 and 102 for the knife 80. As may be seen, each pair of these fingers 96–98 and 100–102 diverge outwardly from the bar 56 and serve to guide the corn into engagement with the associated knife. Each of the fingers comprises a shear plate 96a, 98a, 100a, and 102a and an angle iron support 96b, 98b, 100b, and 102b. The inner ends of the shear plates 96a, etc., engage the underface of the bar 56 and are secured to and supported on the bar 56 by bolts, such as the bolt 96c which extends through the bar 56, through the shear plate 96a and the angle iron 96b and by nuts such as the nut 96d which is drawn up tight against the underface of the horizontal flange of the angle iron 96b.

Behind each of the knives a plate is suitably secured, as by welding, against the rear edge of the bar 56, that associated with knife 78, being designated 104, and that associated with the knife 80, being designated 106. As may be seen in FIGURE 4, these plates 104 and 106 are somewhat thicker than the bar 56 so that when secured thereto with their upper faces flush with the upper surface of the bar 56, they extend down below that bar into engagement with the rear edges of the associated shear plates, such as 96a and 98a, and into engagement with portions of the top surfaces of the angle iron supports, such as 96b and 98b, which extend a short distance to the rear of the bar 56 as best seen in FIGURE 3.

The projecting portions of the associated angle irons, such as 96b and 98b, are suitably secured to plates 104 and 106, as for example, by welding, which serves to secure the guide fingers, such as 96 and 98, in their desired diverging relationship. The engagement of the rear edges of the shear plates, such as 96a and 98a, with the plates 104 and 106 also serves this same purpose.

Each of the knives 78 and 80 also have associated therewith a clamping plate, 108 and 110, respectively. The bolts, such as 96c, also extend through these clamping plates and thereby serve to secure them to the bar 56. As best seen in FIGURE 4, the clamping plates 108 and 110 extend down around the forward edge of the slide 82 into engagement with the upper surfaces of the knives 78 and 80, thereby holding them in proper engagement with the shear plates, such as 96a.

Each of the guides also includes a corn guide rod such as 96e. These guide rods, which have the configuration shown, extend out forwardly of the angle iron supports, such as 96b, to further aid in guiding the cornstalks into engagement with the knives 78 and 80.

Novel means is employed to secure these rods on the fingers, as best seen in FIGURE 3. To this end, an internally threaded burr, such as 96f, is suitably secured to the inner surface of each angle iron support, such as 96b, as, for example by welding, at approximately the location indicated in FIGURE 3. In addition, as indicated for example at 96g, at the outer end of each angle iron, such as 96b, the two flanges thereof are rolled inwardly until they are in engagement, defining an opening at the end of the angle iron of approximately the same size as the guide rod, such as 96e. The guide rods extend through these openings and their threaded inner ends, such as 96h, are threaded into the burrs, such as 96f, as shown, and locked in the desired position by a lock nut, such as 96j, turned up tight against the associated burr 96f.

The slide 82 is driven to reciprocate knives 78 and 80 by a hydraulic motor 112 suitably mounted on the bar 56 adjacent its inner end. The motor 112 drives the slide 82 through a connecting rod 114 rotatably mounted at one end on a stub shaft 116 positioned off-center on the drive wheel 118 of the motor 112 and is mounted on its other end in a bearing 120 suitably secured, as, for example, by welding, on the upper surface of the slide 82.

The bar 56 and associated elements are raised and lowered by means of a hydraulic cylinder 122 and cooperating piston 124. As shown in FIGURE 1, the cylinder 122 is bolted to a bracket 126 which is, in turn, bolted to the arm 42. In like manner the piston 124 is bolted to a bracket 128 which is, in turn, bolted to the arm 44. Hydraulic fluid under pressure to operate the cylinder and piston 122–124 is controlled and supplied through lines 130 and 132 from the tractor 20 or like vehicle. Fluid for operation of the hydraulic motor 112 is similarly controlled and supplied through lines 134 and 136.

The parallelogram structure 40–42–44–50 is supported in its operating position against forces acting parallel to the direction of movement of tractor 20 by a rod or brace 138 suitably secured on its inner end to the tractor 20. As may be seen in FIGURE 1, the outer end of this brace is turned downwardly and extends in an opening in a bracket 140 bolted to the arm 42 as best seen in FIGURE 2. It may be secured in this position by a cotter pin 142 extending through the brace 138 below the bracket 140.

So that the tractor 20 with the attachment 22 mounted thereon may travel on public roads, it is desirable to be able to rotate the arm 56 from the position shown in full lines in FIGURE 2 to the position shown in dotted lines in that same figure. For this purpose, as shown in FIGURE 5, the collar 58 has a second set of diametrically opposed openings 144 and 146 formed therein, the axis of which extends at 90° to that of the openings 60 and 68 previously described. To prepare the attachment for road travel, the shear pin 74 is removed, permitting the arm 56 to be rotated to the desired position, bringing the openings 144 and 146 into alignment with the openings 70 and 72 in the upright 50 whereupon the shear pin may be inserted through these aligned openings to maintain the arm 56 in the road travel position.

Attention is next directed to FIGURES 6 and 7 which, as indicated above, illustrate a modification of the attachment shown in FIGURES 1 and 5. In this modification the shear type sickle cutters are replaced with rotary cutting blades.

Except for the alterations required to substitute the one type of cutter for the other, the structure is the same as that previously described. Thus, the bar 56 is retained along with the structure on which it is supported as are the corn guide fingers, such as 96 and 98, the plates, such as 104 which aid in supporting them, and the corn guide rods, such as 96e and 98e. The parts which are omitted along with the knives 78 and 80 are the slide 82, the guides, such as 84 and 86, and the plates 108 and 110.

Instead of mounting the motor 112 on top of the bar 56, a right angle bracket 148 is employed which is bolted to the underside of the bar 56 and to the other flange of which the motor 112 is bolted so that the motor shaft extends vertically. The motor drive wheel 118 is also replaced with a toothed sprocket 150 which is suitably secured to the motor shaft to be driven thereby.

Centrally between the pair of corn guides or corn guide fingers 96 and 98 bearings 152 and 154 are mounted upon the upper and lower surfaces of the bar 56 and in like manner bearings 168 and 170 are mounted centrally between the corn guides 100 and 102. Shafts 156 and 172 are supported for rotation, respectively, in bearings 152 and 154 and in bearings 168 and 170 and respectively carry at their lower ends rotary cutting blades 158 and 174 which are secured on the respective shafts to rotate therewith by set screws 160 and 176. Above the bearing 152 the shaft 156 has secured thereon a pair of smaller toothed sprockets 162 and 164. The sprocket 162 is driven by a means of a chain 166 which passes around that sprocket and around the sprocket 150.

Above the bearing 168 a sprocket 178 identical with sprockets 162 and 164 is secured on the shaft 172 to drive the blade 174. By means of a chain 180 passing around sprockets 164 and 178 the latter is driven by the former.

In some instances it may be desirable to have the entire structure including the arms 42 and 44, the upright 50, and the hydraulic cylinder and piston 122–124 as well as the arm 56 and elements carried thereby pivotable with respect to the tractor 20. Such a modification is illustrated in FIGURES 8 and 9.

In this modification the upright 40 is replaced by a tubular upright 182 which similarly to the upright 40 is bolted to the protruding ends of the angle iron pieces 24 and 26. Adjacent to the bottom of the upright 182 a supporting collar 184 is secured in the proper position thereon by means of a pin 186 which extends through aligned openings in the collar and upright similarly to the pin 74 as shown in FIGURE 5 and which may also be secured in place by a cotter pin if desired. The collar 184 supports another collar 188 which is rotatable or pivotable on the upright 182. As best seen in FIGURE 9, the collar 188 is provided with a pair of ears 190 and 192. The inner end of the arm 44 previously described is bolted to those ears as shown in FIGURE 8.

Seated on the upper end of the upright 182 is a cap 194 which is also rotatable or pivotable on the upright 182. This cap 194 is also provided with a pair of ears identical with the ears 190 and 192 to which the arm 42 previously described is bolted. A shear pin 196 similar to the pin 74 shown in FIGURE 5 is similarly inserted through the cap 194 and the upright 182 and secured with a cotter pin to serve the same purpose as the shear pin 74. The cap 194 may also be provided with openings corresponding to openings 144 and 146 in cap 58 so as to permit the rotatable attachment to be secured in a position extending longitudinally of the tractor 20.

As an alternative to pivoting the arm 56 in a horizontal plane to a position in which it extends longitudinally of the tractor 20 or other supporting vehicle in order to facilitate road travel, the arm 56 may be arranged to pivot on a horizontal axis into a vertically extending position for the same purpose. A structure by which this may be accomplished is illustrated in FIGURES 10 and 11.

Referring now more particularly to those figures, it will be seen that the same tubular upright 50 shown in FIGURE 1 is also employed in this modification and that, as shown and described in connection with that figure, it is bolted to the outer ends of arms 42 and 44 as indicated at 52 and 54. The same cap 194 shown in FIGURE 8 is also employed in this embodiment and is seated on the top of the upright 50. In place of the collar 58 shown in FIGURE 1, however, the arm 56 at its inner end has secured thereto or formed thereon a pair of upwardly extending ears 198 and 200. Suitable openings are provided in these ears so that, as indicated in FIGURE 11, they may be bolted to the ears on cap 194.

The upright 50 also has positioned thereon the same supporting collar 184 shown in FIGURE 8 and held in position by the pin 186. Supported on the collar 184 is a collar 202 identical with the collar 188 shown in FIGURE 8 except that no perforations are required in the ears 190 and 192. Braces 60 and 62 as hereinbefore described in connection with FIGURE 1 are, as previously set forth, welded or otherwise suitably secured at their upper ends to the underside of the arm 56. The lower ends of these arms, however, instead of being welded in place, are loosely received between the ears of the collar 202, and maintained therein solely by the weight of the arm 56 and elements carried thereby and thus serve to maintain that arm in the desired horizontal position.

It will be apparent that to prepare the attachment for road travel, it is turned on the pivot 204 indicated in FIGURE 11 into the desired vertically extending position, during which operation the lower ends of the braces 60 and 62 are moved out from their position between the ears on the collar 202. The arm is then secured in the vertically extending position by a brace 206 attached on its inner end to the tractor 20 and provided with a forwardly extending portion which is received in a bracket 208 mounted on the underside of the arm 56. The brace may be secured in this position by means of a cotter pin 210 extending through a suitable opening adjacent the end of the forwardly extending portion thereof.

The cap 194 and the collar 202 are rotatable on the upright 50 and a shear pin 196, as previously described, similarly to the shear pin 74 shown in FIGURE 5, is inserted through suitable openings in the cap 194 and the upright 50 and held therein by a cotter pin. Thus, in this modification also, the arm and associated elements are protected from damage by an encounter with an object such as a tree or the like.

The operation of the attachment 22 will be largely apparent from the foregoing description. By means of the cylinder and piston combination 122–124, the arm 56 is set at the proper height to cut off that portion of the tops of the cornstalks which is not desired in the subsequent harvesting of the remainder of the corn. The arm 56 at all such positions to which it may be adjusted being maintained at all times parallel with a plane through the ground contacting portions of the tractor 20 by means of the parallelogram 40–42–44–50. The motor 112 being put into operation to drive the cutting means, the tractor 20 is then moved forward alongside the rows of corn from which the tops are to be severed.

Many of the advantages of the invention will be apparent from the foregoing description. By reason of the fact that the attachment 22 extends out laterally from the tractor or other vehicle on which it is supported, the tractor can be driven alongside of the rows of corn from which the tops are to be severed, thereby preventing the portions of the cornstalks which remain after the tops have been severed from being pushed over as would result if the tractor were driven over them, thus interfering with the subsequent harvesting of those remaining portions. The parallelogram support also provides the further advantage that the attachment can be readily adjusted for corn of varying heights and can be provided with means for severing the heads of corn in two or more rows at the same time.

I claim:

1. A corn topping device used in combination with a vehicle which comprises means for supporting said device on a vehicle, an arm having means thereon for severing the tops from at least two rows of corn simultaneously and which is supported solely adjacent its inner end by said first named means, said arm in its normal operating position extending laterally outwardly from the vehicle and positioning the severing means thereon to make all cuts at substantially the same distance above a plane passing through the ground contacting portions of said vehicle and said first named means including means which positions the severing means on the said arm to make all said cuts at any one of a plurality of different distances above said plane and which comprises four members pivotally connected to each other adjacent their ends in the form of a parallelogram, one of said members being secured in a fixed position relative to said vehicle and the other three being free to move relative to each other and to the said one member by movement about their pivotal connections and the said arm being supported on the member which is parallel to the said fixed member and which also comprises a hydraulic cylinder and a cooperawhich also comprises a hydraulic cylinder and a cooperating piston, the piston being secured to one of said last named members and the cylinder being secured to another of said members which is directly connected to the member to which the piston is secured and said cylinder and piston being operated by fluid controlled and supplied from said vehicle.

2. A corn topping device used in combination with a vehicle which comprises means for supporting said device on a vehicle including four members pivotally connected to each other adjacent their ends in the form of a parallelogram, one of said members being secured in a fixed position relative to said vehicle and the other three being free to move relative to each other and to the said one member by movement about their pivotal connections, an arm having means thereon for severing the tops from at least two rows of corn simultaneously, and which is supported solely by said first named means on the member which is parallel to the said fixed member, said arm in its normal operating position extending laterally outwardly from the vehicle and positioning the severing means thereon to make all cuts at substantially the same distance above a plane passing through the ground contacting portions of said vehicle at any one of a plurality of different distances above said plane.

3. A device is described in claim 2 in which said first named means comprises a pivot on which said arm is pivotable and means associated with said pivot for maintaining the arm in its said normal operating position against the force exerted thereon by its engagement with cornstalks and permitting it to be pivoted on said pivot by the force exerted thereon by its engagement with a relatively immovable object.

4. A device as described in claim 3 in which the said pivot is located at the inner end of the arm.

5. A device as described in claim 3 in which the said pivot is remote from the inner end of the arm and adjacent to the vehicle.

6. A device as described in claim 3 in which the pivotal movement of the arm occurs in a plane which is, at least, approximately parallel with a plane through the ground contacting portions of said vehicle.

7. A device as described in claim 3 which comprises means for securing said arm in a position in which it is, at least approximately, parallel to the longitudinal axis of the vehicle.

8. A device as described in claim 7 in which the said pivot is located at the inner end of the arm.

9. A device as described in claim 7 in which the said pivot is remote from the inner end of the arm and adjacent to the vehicle.

10. A device as described in claim 2 which comprises means on said arm for guiding the cornstalks into contact with the said severing means which comprises, at least, two guide members secured to the said arm, respectively, adjacent to and on opposite sides of the location at which the severing means severs the said tops and extending forwardly of the said arm in diverging relation and, at least, two corn guide rods carried, respectively, by said guide members and extending forwardly thereof in diverging relation, the inner ends of said guide rods being removably secured to said guide members and the forward ends of said guide members being wrapped around the said rods.

11. A corn topping device as described in claim 10 in which the guide members comprise lengths of angle iron, the forward ends of which are wrapped around the guide rods and in which the inner ends of the guide rods are threaded into openings in the guide members and locked therein with lock nuts.

12. A device as described in claim 2 in which said arm is supported solely adjacent its inner end by said first named means.

13. A device as described in claim 2 in which said first named means comprises a pivot on which said arm is pivotable from its said normal operating position to a position in which it is generally parallel with the path of movement of the said vehicle and means for securing the arm in the last named position.

14. A device as described in claim 2 in which the means for supporting said arm comprises means for raising and lowering the said arm to vary the distance above the said plane at which all cuts are made.

15. A device as described in claim 14 in which in the normal operating position of the arm the longitudinal axis thereof and the longitudinal axes of said four pivotally connected members all extend, at least, approximately in a single plane which is perpendicular to the longitudinal axis of the vehicle.

16. A device as described in claim 14 in which the means for raising and lowering the arm is hydraulically operated by fluid controlled and supplied from the said vehicle.

17. A device as described in claim 2 in which the severing means is hydraulically driven by fluid controlled and supplied from the said vehicle.

18. A device as described in claim 17 in which the severing means is a shear type sickle.

19. A device as described in claim 17 in which the severing means is rotary.

References Cited

UNITED STATES PATENTS

| | | | |
|---|---|---|---|
| 2,729,044 | 1/1956 | Dunn et al. | 56—25 |
| 3,025,653 | 3/1962 | Ackermann | 56—53 |
| 3,325,982 | 6/1967 | Fogels et al. | 56—16 |

ANTONIO F. GUIDA, *Primary Examiner.*

U.S. Cl. X.R.

56—25, 17